United States Patent
Chow

(10) Patent No.: US 6,899,015 B2
(45) Date of Patent: May 31, 2005

(54) SAFETY DEVICE FOR SPRING BRAKES

(75) Inventor: Lai Yee Chow, Hong Kong (CN)

(73) Assignee: Metro Bearing & Automotive Limited, Hong Kong (CN)

( * ) Notice: Subject to any disclaimer, the term of this patent is extended or adjusted under 35 U.S.C. 154(b) by 0 days.

(21) Appl. No.: 10/700,394

(22) Filed: Oct. 30, 2003

(65) Prior Publication Data
US 2005/0092173 A1 May 5, 2005

(51) Int. Cl.$^7$ .............................................. F01B 19/00
(52) U.S. Cl. ...................................... 92/98 R; 92/101
(58) Field of Search ............................. 92/98 R, 98 D, 92/99, 101

(56) References Cited

U.S. PATENT DOCUMENTS 2,724,410 A * 11/1955 Vorech ......................... 92/101
3,331,291 A * 7/1967 Rumsey ........................ 92/101
5,992,297 A * 11/1999 Plantan et al. ............... 92/98 R

* cited by examiner

Primary Examiner—Edward K. Look
Assistant Examiner—Michael Leslie

(57) ABSTRACT

The present invention relates to a safety device for spring brakes comprising a C-clamp, the opening of which is just fit to accommodate the edges of the two chambers and the diaphragm of an air brake; and a body plate, which is being cast with the C-clamp as one integral body and is welded onto an outer surface of the first chamber of the air brake. The safety device can securely engage the two chambers to prevent the spring, the diaphragm and the second chamber from bursting out of the first chamber, causing damage to properties and/or injuries to anybody in the surrounding area.

3 Claims, 3 Drawing Sheets

SAFETY DEVICE FOR SPRING BRAKES

BACKGROUND OF THE INVENTION

The present invention relates to a safety device for vehicle brakes and more particularly pertains to a safety device for spring brakes which prevents the disengagement of the two chambers.

A conventional spring brake generally comprises a first chamber, a second chamber, a diaphragm, a spring and a pushrod connecting to a braking device such as a brake shoe or brake pad. The diaphragm is placed between the two chambers. The spring is heavily coiled between the diaphragm and the bottom of the first chamber. By controlling the amount of air pressure applied to the diaphragm and thereby controlling the compression of the spring, the driver can apply or release the brake. As a significant amount of energy is stored in the coiled spring, it is vital to hold the two chambers and the diaphragm in place to prevent the spring from bursting out of the first chamber.

To this end, a conventional spring brake is typically equipped with a clamp band to engage the two chambers together with the diaphragm in between. However, if a user inadvertently loosens or disassembles the clamp band by loosening a screw thereon, or if the clamp band is loosened accidentally owing to, for example, a bump to the vehicle, or if the clamp band becomes out of order and fails to engage the chambers properly, the diaphragm is no longer securely fastened and thus can no longer keep the spring in place. As a result, the spring together with the diaphragm and the second chamber may burst away from the first chamber. In such a case, anybody in the surrounding area may be injured or even killed by the parts bursting away from the first chamber, let alone damage is likely to be caused to properties in the neighborhood.

With a view to preventing such incidents, some spring brakes have the housing of the first chamber and the clamp band being cast as one integral body. The second chamber is fastened to the first chamber by the method of spinning. The two chambers are then permanently joined together. Although such arrangement can prevent any accidental disengagement of the two chambers, it is susceptible of higher production costs and lower manufacturing efficiency. Moreover, if any component has any defect or if there is any error or abnormality during the assembling procedures, the air brake may fail to function properly and may not be repaired and will have to be disposed of, which results in a waste of resources.

BRIEF SUMMARY OF THE INVENTION

In view of the aforesaid disadvantages now present in the prior art, the present invention provides a safety device for spring brakes which can securely engage the two chambers, thus preventing any accidental disengagement of the two chambers.

To attain this, the present invention generally comprises a C-clamp and a body plate being cast as one integral body; the opening of the C-clamp is just fit to accommodate the edges of the two chambers and the diaphragm of a spring brake; the body plate is welded onto the outer surface of the first chamber at a position corresponding to the bolt of the clamp band such that the C-clamp passes through the gap between the bolt of the clamp band and the interface of the two chambers, keeping the two chambers and the diaphragm securely in place.

The body plate has a plurality of holes for the installation of nuts and bolts to ensure the body plate is securely fixed onto the outer surface of the first chamber.

One or more safety device of the present invention can be used onto one spring brake.

It is an object of the present invention to provide a safety device for spring brakes which can securely engage the two chambers to prevent the spring, the diaphragm and the second chamber from bursting out of the first chamber, causing damage to properties and/or injuries to anybody in the surrounding area.

It is another object of the present invention to provide a safety device for spring brakes which functions as an additional safety guard against any accidental loosening or disassembling of the clamp band.

It is a further object of the present invention to provide a safety device for spring brakes which is of simple and reliable construction.

It is another further object of the present invention to provide a safety device for spring brakes which is susceptible of a low cost of manufacture with regard to both materials and labor, and which accordingly is then susceptible of low prices of sale to the consuming public, thereby making such device economically available to the buying public.

An even further object of the present invention is to provide a safety device for spring brakes which is readily applicable for existing conventional spring brakes, which use a clamp band to clamp the two chambers and the diaphragm together.

DETAILED DESCRIPTION OF THE INVENTION

Figure 1:
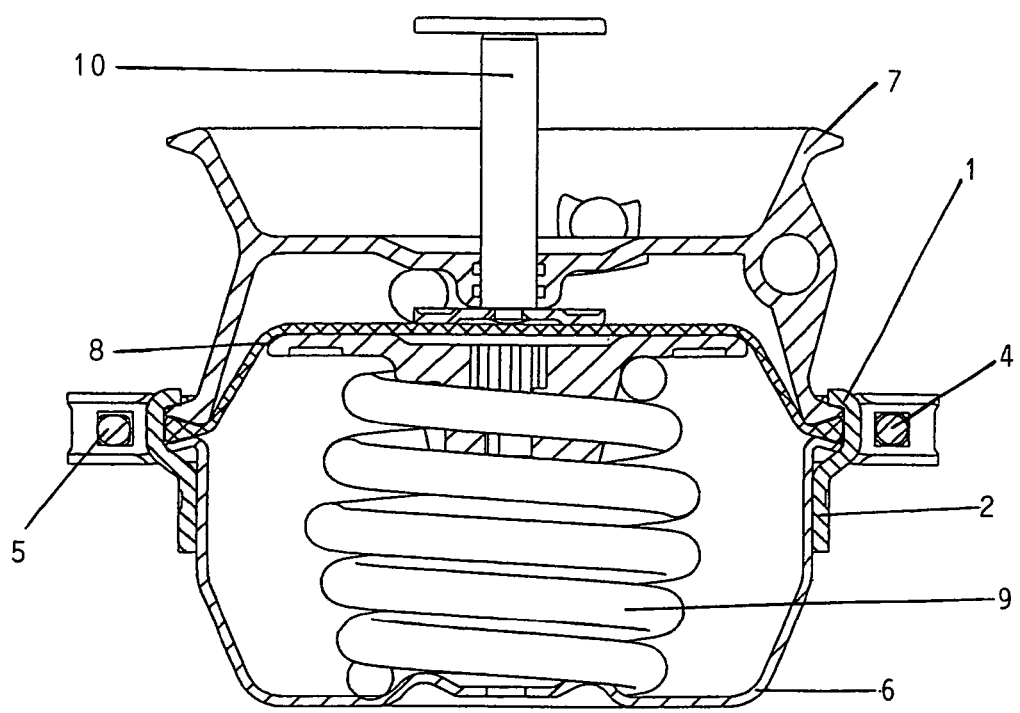
FIG. 1 shows the cross-sectional view of a part of a spring brake incorporating the present invention.
Figure 2:
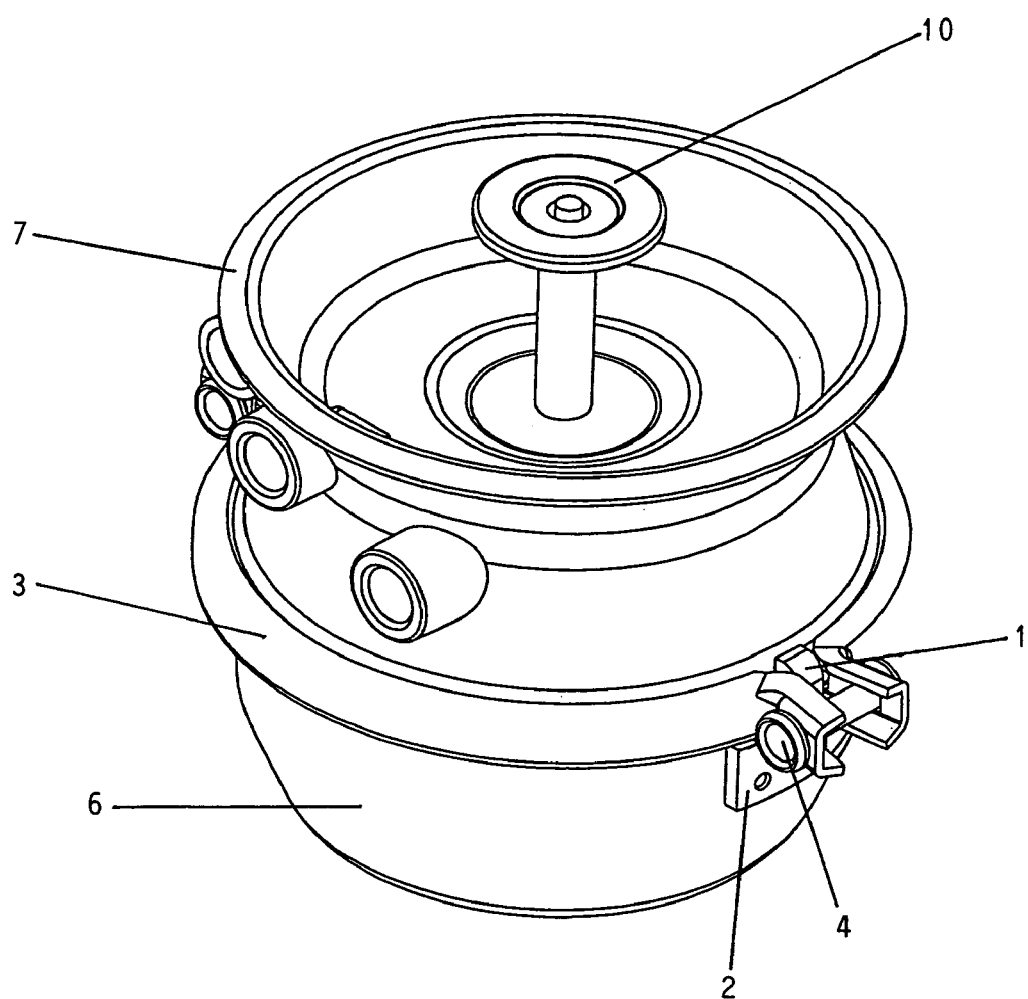
FIG. 2 shows the perspective view of a part of a spring brake incorporating the present invention.
Figure 3:
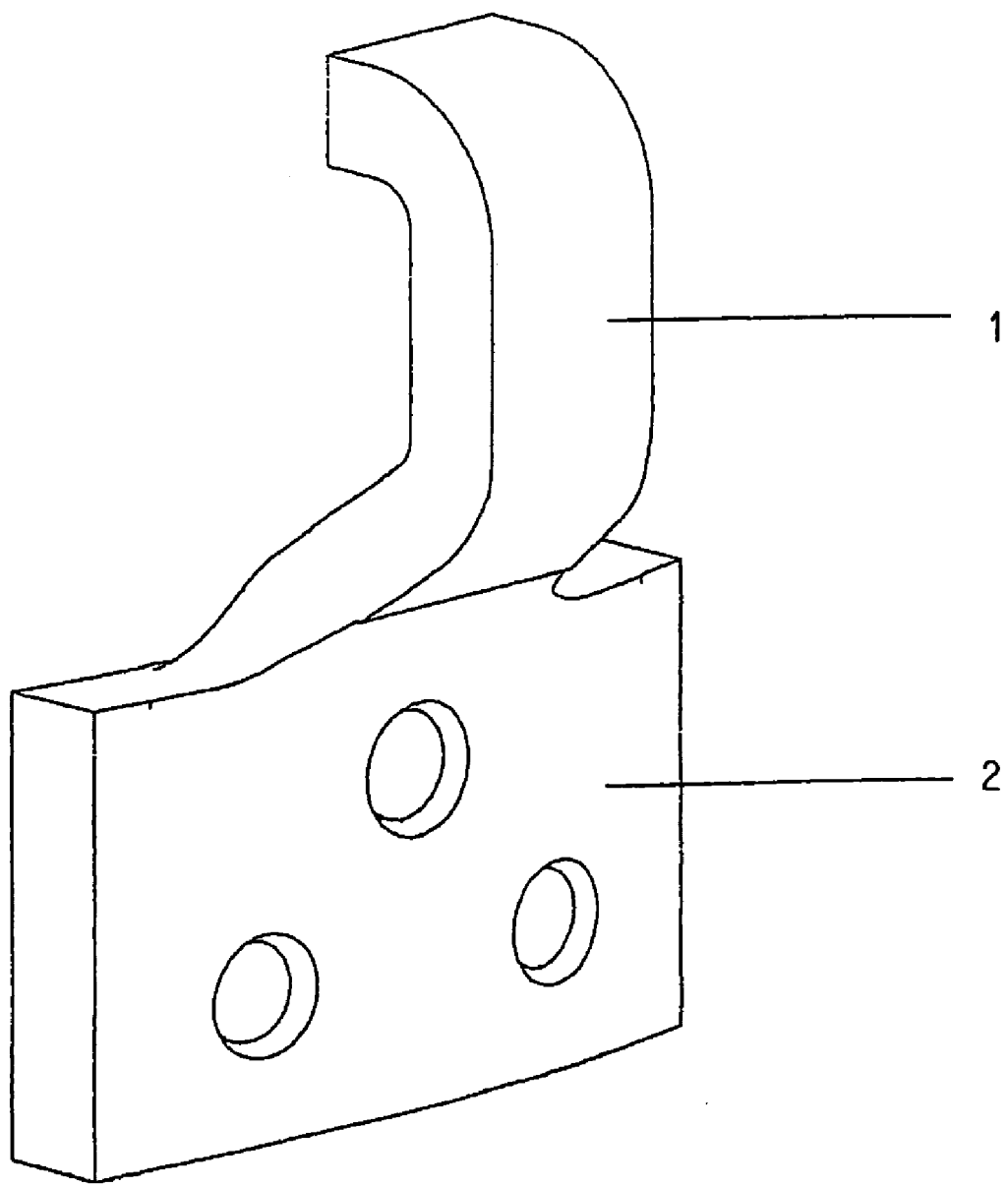
FIG. 3 shows the perspective view of the present invention.

As illustrated in FIG. 3, the safety device of the present invention generally comprises a C-clamp 1 and a body plate 2. The C-clamp 1 and the body plate 2 are made of metal and cast as one integral body. As shown in the figure, there are three holes on the body plate 2 for optional use of nuts and bolts to fix the body plate 2 onto the outer surface of an air brake and the number of holes can vary. As illustrated in FIGS. 1 and 2, two safety devices of the present invention are applied to a conventional spring brake which comprises a first chamber 6, a second chamber 7, a diaphragm 8, a spring 9 and a pushrod 10. The two chambers 6, 7 are secured together by a clamp band 3. The clamp band 3 is secured tightly by bolts 4, 5. By loosening either bolt 4 or bolt 5 or both, the clamp band 3 can be loosened.

The body plate 2 is welded onto the outer surface of the first chamber 6. In addition, nuts and bolts (not shown in the figures) can be added to fix the body plate 2 even more securely onto the outer surface of the first chamber 6. The body plate 2 is welded onto the first chamber 6 at a position corresponding to that of the bolt 4 and another body plate 2 is welded at a position corresponding to that of the bolt 5 in a way that the C-clamp 1 of each safety device passes through the gap between the bolt 4 or 5 and the interface of the two chambers 6, 7, thereby the C-clamp 1 can secure the two chambers 6, 7 and the diaphragm 8 in place. The opening of the C-clamp 1 is just fit to accommodate the edges of the two chambers 6, 7 and the diaphragm 8.

If a user inappropriately loosens the bolt 5 or 6, or if the bolt 5 or 6 is accidentally loosened, or if the clamp band 3 becomes out of order and fails to secure the two chambers 6, 7 and the diaphragm 8 in place, the C-clamp 1 will restrain the spring 9 together with the diaphragm 8 and the second chamber 7 from bursting out of the first chamber 6, thus preventing any damage to properties and/or any personal injuries from incurring.

As to a further discussion of the manner of usage and operation of the present invention, the same should be apparent from the above description. Accordingly, no further discussion relating to the manner of usage and operation is provided.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The present invention is capable of other embodiments and of being practiced and carried out in various ways. It is to be understood that the phraseology and terminology employed herein are for the purpose of description and should not be regarded as limiting.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A safety device for spring brakes having a first chamber, a second chamber, a diaphragm, a spring and a clamp band, comprising:

a C-clamp, the opening of which is just fit to accommodate the edges of the two chambers and the diaphragm; and a body plate, which is being cast with the C-clamp as one integral body and is welded onto an outer surface of the first chamber at a position corresponding to the bolt of the clamp band such that the C-clamp passes through the gap between the bolt of the clamp band and the interface of the two chambers, keeping the two chambers and the diaphragm securely in place.

2. A safety device for spring brakes as in claim 1, wherein the body plate has a plurality of holes for the installation of nuts and bolts to ensure the body plate is securely fixed onto the outer surface of the first chamber.

3. A safety device for spring brakes as in claim 1, wherein the safety device can be used singly or in combination onto one spring brake.

* * * * *